(No Model.)
G. ENDRES.
COUPLING FOR STRADDLE ROW CULTIVATORS.
No. 303,270. Patented Aug. 12, 1884.
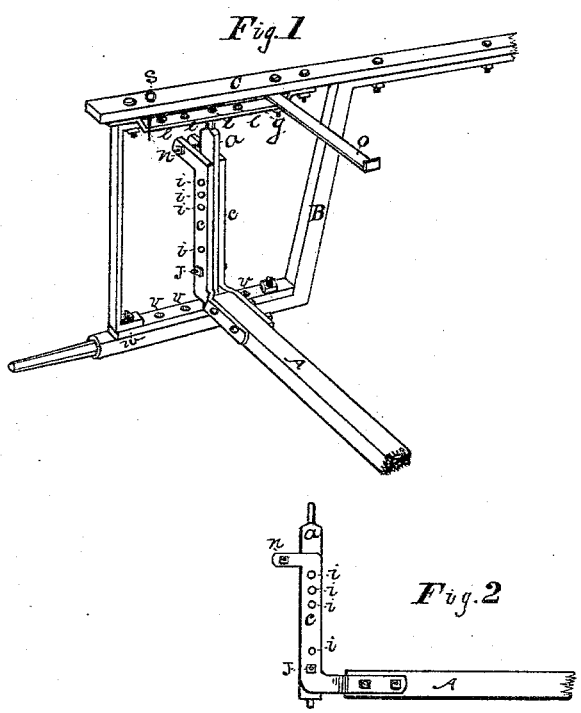
WITNESSES:
T. J. Price
W. J. Price
INVENTOR
George Endres

UNITED STATES PATENT OFFICE.

GEORG ENDRES, OF NEW PHILADELPHIA, ILLINOIS.

COUPLING FOR STRADDLE-ROW CULTIVATORS.

SPECIFICATION forming part of Letters Patent No. 303,270, dated August 12, 1884.

Application filed April 30, 1884. (No model.)

*To all whom it may concern:*

Be it known that I, GEORG ENDRES, a resident of New Philadelphia, in the county of McDonough and State of Illinois, have invented a new and useful Improvement in Couplings for Straddle-Row Cultivators, of which the following is a specification, which will enable others skilled in the art to make and use the same, reference being had to the accompanying drawings, and to the letters of reference marked thereon.

The nature and object of this invention is to construct a coupling for straddle-row cultivators that is simple in its construction and efficient and durable in all its parts, and quickly adjusted as to draft or distance between the gangs, and can be attached to all kinds of cultivators now in use; and its novelty consists in a coupling-bar having round bearings at each end, and a series of draft-holes, in combination with two jaws—one on each side—having their lower ends suitably formed so as to be attached firmly to the plow-beams, their upper ends being bent out at right angles and provided with a stay-bolt; second, in the combination, with the coupling-bar and the side jaws and beam, of a lock bar and pin, and a bar at each end of the coupling-bar, each containing a series of holes for adjusting the width of the plow-gangs.

In the drawings, Figure 1 is a perspective view. Fig. 2 is an elevation of the coupling detached.

Similar letters in each figure indicate like parts.

A represents the plow-beam; B, the axle, which is suitably bent to form an arch.

C is a cross-beam, made of wood, bolted on top of the arch.

*a* represents the coupling-bar, which has round bearings at each end, the upper bearing being double the length of the lower one. On each side of this bar is placed the jaws *c c*, which at the lower ends are curved and formed so that they can be firmly attached to the plow-beam A. The upper ends are bent out at right angles, and are held in place by the stay-bolt *n*. The coupling-bar *a* and jaws *c c* have a series of holes, *i i i i*, which are directly opposite each other, so that the draft-bolt J can be placed in any of the holes that may be required. Attached to the axle is a metal bar, *w*, which is provided with a series of holes, *v v v*, which correspond with a series of holes, *e e e e*, in the bar *g*, attached to the under side of the beam C.

*o* is a lock-bar, and *s* is a pin to keep the lock-bar in place.

In operating, the bolts *n* and J are adjusted so as to allow the jaws *c c* to work freely on the coupling-bar *a*, the bolt J being the pivot and draft bolt, which can be placed in any of the holes *i i i i* to change the height of the draft that may be required. The coupling-bar *a* is placed in one of the holes *e* at the top, then raised up sufficient to let the lower end in one of the holes *v*. The pin *s* is then drawn out, and the lock-bar *o* is turned round under the beam C and over the end of the coupling *a*, and locks it. The pin *s* is then placed in its shown position, which prevents the bar *o* from getting out of place. The coupling can be changed quickly to another hole by drawing the pin *s* and turning the bar *o* out to its shown position. The coupling can then be lifted out and placed wherever required. This manner of constructing a coupling gives the operator perfect control of the gangs, and allows them to have all the necessary movement that is required to do good work. I do not confine myself to this manner of attaching the coupling to all styles of cultivators, as shown, in every particular, as I am aware that the beam C can be made of metal, and the holes *e e e* can be formed in it, and the lock-bar *o* could be placed on top and held in place by a suitable thumb-button; also, the holes *v v v* can be made in the axle B, and the bar *w* placed underneath the axle, which would operate just as well as the plan shown.

Having thus described my invention, what I claim as new, and desire to secure by Letters Patent, is—

1. In a coupling for straddle-row cultivators, the coupling-bar *a*, having round bearings at each end and a series of draft-holes, *i i i i*, in combination with the jaws *c c*, having a series of holes corresponding with the draft-holes *i i i i*, and being suitably formed at the lower ends so as to be firmly attached to the beam A, the upper ends being bent out at right angles sufficient to receive the stay-bolt $n$, substantially as shown and described, for the purpose set forth.

2. In a coupling for straddle-row cultivators, the combination, with the coupling-bar $a$, jaws $c$ $c$, and beam A, of the lock-bar $o$, pin $s$, and the bars $w$ and $g$ or their equivalent, having a series of holes, $v$ $v$ $v$ and $e$ $e$ $e$ $e$, substantially as and for the purpose set forth.

GEORG ENDRES.

Witnesses:
L. J. PRICE,
W. T. PRICE.